United States Patent
Jo (10) Patent No.: US 10,466,952 B2
(45) Date of Patent: Nov. 5, 2019

(54) MULTI-VISION HAVING DAISY CHAIN TYPE AND ID ALLOCATING METHOD THEREOF

(71) Applicant: LG ELECTRONICS INC., Seoul (KR)

(72) Inventor: Youngkyu Jo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 306 days.

(21) Appl. No.: 15/520,794

(22) PCT Filed: Aug. 28, 2015

(86) PCT No.: PCT/KR2015/009067
§ 371 (c)(1),
(2) Date: Apr. 20, 2017

(87) PCT Pub. No.: WO2016/068471
PCT Pub. Date: May 6, 2016

(65) Prior Publication Data
US 2017/0329568 A1   Nov. 16, 2017

(30) Foreign Application Priority Data
Oct. 27, 2014   (KR) .......................... 10-2014-0146347

(51) Int. Cl.
G06F 3/14        (2006.01)
H04N 5/64        (2006.01)
H04N 5/44        (2011.01)

(52) U.S. Cl.
CPC ......... *G06F 3/1446* (2013.01); *H04N 5/4403* (2013.01); *H04N 5/64* (2013.01);
(Continued)

(58) Field of Classification Search
CPC .......... G06F 3/1446; G06F 3/14; G06F 13/00; G06F 13/28; G06F 13/4247;
(Continued)

(56) References Cited

U.S. PATENT DOCUMENTS 5,987,532 A * 11/1999 Tokui .................... G06F 3/1423
340/9.1
9,152,370 B2 * 10/2015 Kim ....................... G06F 3/1423
(Continued)

FOREIGN PATENT DOCUMENTS

KR   10-2008-0044038    5/2008
KR      10-0839953       6/2008
(Continued)

OTHER PUBLICATIONS

International Search Report and Written Opinion dated Dec. 22, 2015 issued in Application No. PCT/KR2015/009067 (Full English Text).

*Primary Examiner* — Hung T Nguyen
(74) *Attorney, Agent, or Firm* — KED & Associates LLP (57) ABSTRACT

The present invention relates to a multi-vision having a daisy chain type, capable of automatically setting an ID of each multi-vision set in a multi-vision where a plurality of sets are connected to each other in a daisy chain form, and an ID allocating method thereof. The multi-vision having a daisy chain type includes: a plurality of multi-vision sets; a first off switch provided at an IR communication line output port of each of the multi-vision sets, and configured to block an IR signal applied to each multi-vision set; series communication lines connected to the plurality of multi-vision sets in a bypass form; a second off switch provided at an output port of the series communication line of each multi-vision set, and configured to block an ID value which is to be bypassed to a next multi-vision set through the series communication line; and a controller configured to set an ID
(Continued)

of a reference multi-vision set by blocking the first and second off switches, and configured to transmit an ID increased value to a next multi-vision set by releasing the blocked output state of the second off switch from the reference multi-vision set.

17 Claims, 7 Drawing Sheets

(52) U.S. Cl.
CPC . *G09G 2370/042* (2013.01); *G09G 2370/047* (2013.01); *G09G 2370/22* (2013.01)

(58) Field of Classification Search
CPC .... G06F 13/4256; H04N 5/4403; H04N 5/64; G11C 5/066; G11C 16/06
USPC ............... 340/3.51, 825.07, 825.52, 825.62; 345/1.1, 1.3; 348/383; 709/223; 710/3, 710/9
See application file for complete search history.

(56) References Cited

U.S. PATENT DOCUMENTS

| 9,240,227 B2* | 1/2016 | Pyeon .................... G11C 5/066 |
| 2005/0062884 A1 | 3/2005 | Fan et al. |
| 2011/0296055 A1 | 12/2011 | Kim et al. |

FOREIGN PATENT DOCUMENTS

| KR | 10-2013-0093853 | 8/2013 |
| KR | 10-2014-0067343 | 6/2014 |

* cited by examiner

FIG. 1

Prior Art

FIG. 2

Prior Art

MULTI-VISION HAVING DAISY CHAIN TYPE AND ID ALLOCATING METHOD THEREOF

CROSS-REFERENCE TO RELATED PATENT APPLICATIONS

This application is a U.S. National Stage Application under 35 U.S.C. § 371 of PCT Application No. PCT/KR2015/009067, filed Aug. 28, 2015, which claims priority to Korean Patent Application No. 10-2014-0146347, filed Oct. 27, 2014, whose entire disclosures are hereby incorporated by reference.

TECHNICAL FIELD

The present invention relates to a multi-vision having a daisy chain type, capable of automatically setting an ID of each multi-vision set in a multi-vision where a plurality of sets are connected to each other in a daisy chain form, and an ID allocating method thereof.

BACKGROUND ART

Generally, a multi-vision indicates a digital image device provided with a plurality of display modules, and configured to display an image on the plurality of display modules in an enlarged manner, or to display an individual image on each of the display modules.

The multi-vision is being widely used not only for broadcasting programs in a public place, but also for advertisements and announcements using a digital signage screen. Further, the multi-vision may be utilized as an interworking service among various screen terminals, such as an N-screen service.

Figure 1:
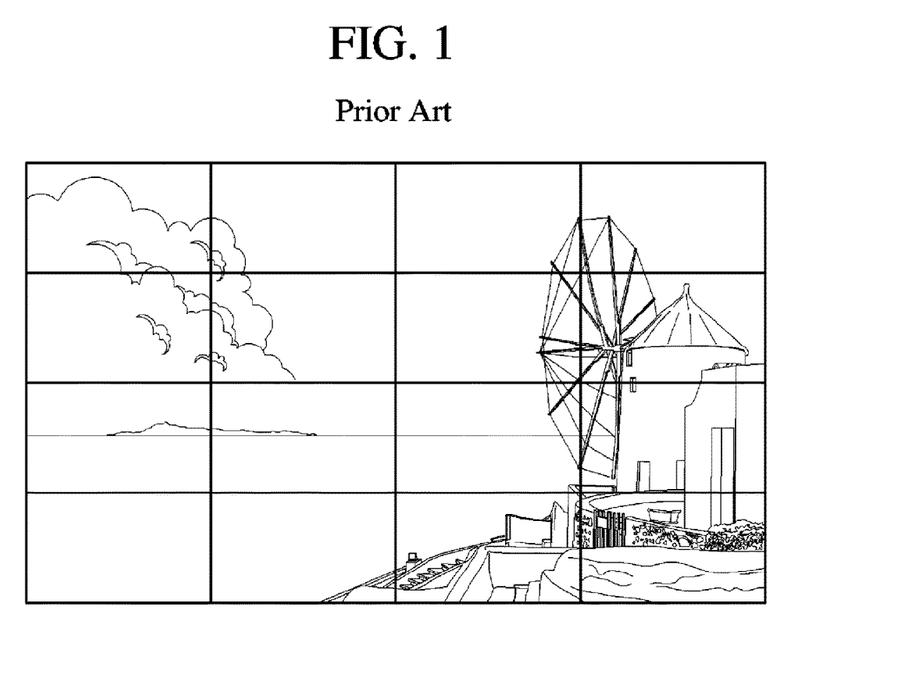
FIG. 1 is a view illustrating an example of a general multi-vision.

FIG. 1 illustrates an example of a multi-vision in accordance with the conventional art.

As shown in FIG. 1, the multi-vision, provided with a plurality of display modules, may display a single image on the plurality of display modules, or display different images on the plurality of display modules. The plurality of display modules (sets) may be connected to each other in a daisy chain form, i.e., in series. The multi-vision may be an outdoor display device such as a digital signage, or may be a home display device for a large screen.

A method of allocating an ID to each display module (set) of the multi-vision is as follows. IDs are individually allocated to the respective display modules by using an IR receiver. Alternatively, a plurality of multi-vision sets are connected to each other in a daisy chain form, and then IDs are sequentially allocated to the multi-vision sets in a horizontal-direction writing manner.

Figure 2:
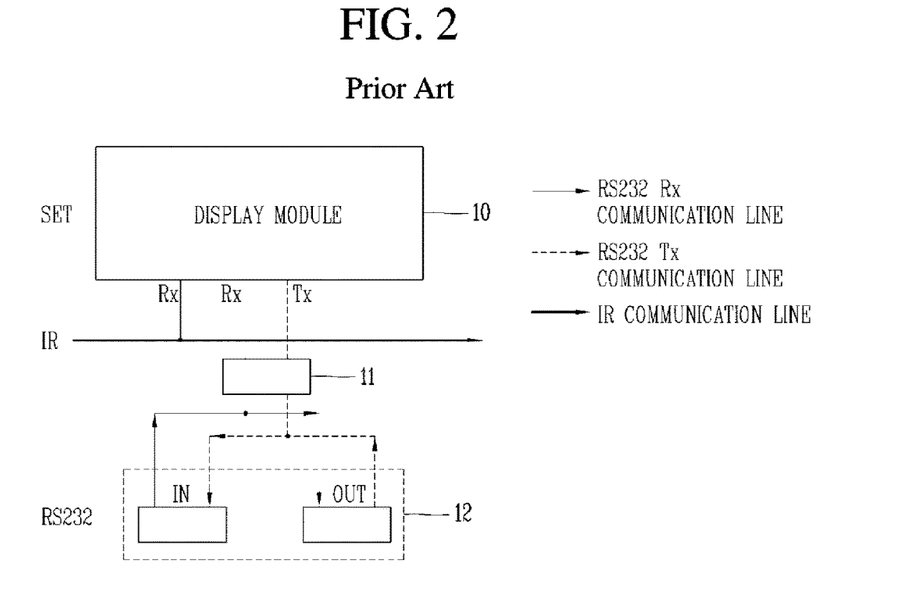
FIG. 2 is a configuration view of a single multi-vision set.

FIG. 2 is a configuration view of a single multi-vision set.

As shown in FIG. 2, in each multi-vision set, a first communication terminal (Rx) of a display module 10 is connected to an IR (infrared) communication line, thereby receiving a remote controller signal (IR signal). And communication terminals (communication ports) (Rx, Tx) of the display module 10 receive ID values from an external device (e.g., PC), through an input terminal (IN) of an RS-232 communication port 12, or generates and transmits an ID (ID+1) for a next multi-vision set, through an output terminal (OUT). A switch 11 is provided between the communication terminals (Rx, Tx).

The switch 11 is controlled under control of a controller (not shown), thereby switching the Rx communication terminal and the Tx communication terminal from each other when IDs are received and transmitted. That is, the switch 11 changes the current communication terminal into the Rx communication terminal when receiving an ID, but changes the current communication terminal into the Tx communication terminal when transmitting an ID to the next multi-vision set.

Figure 3:
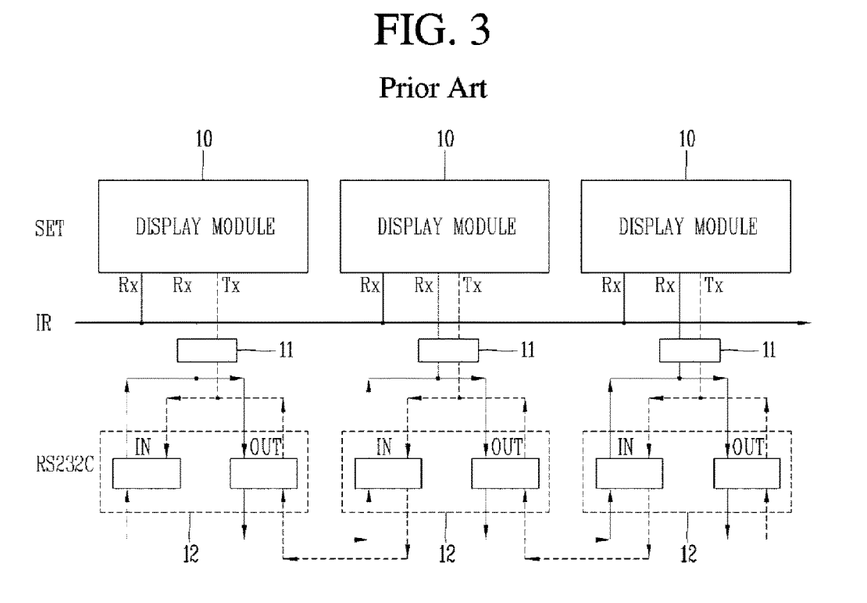
FIG. 3 is a configuration view of a plurality of multi-vision sets connected to each other in a daisy chain form.

FIG. 3 is a configuration view of a plurality of multi-vision sets connected to each other in a daisy chain form.

Referring to FIG. 3, in all of the multi-vision sets, Rx communication lines are connected to each other such that remote controller operations are applied at a time, and RS-232 Tx and Rx communication lines are also connected to each other.

A user may connect the IR receiver to a first multi-vision set, and may transmit an IR signal indicating start of ID allocation by using a remote controller. Once the IR signal is received by the IR receiver, the IR signal is input to all of the multi-vision sets, since the IR line is connected to all of the multi-vision sets. Upon input of the IR signal, a controller of each multi-vision set controls the switch 11 such that the communication terminal (Rx) of the display module 10 is connected to the RS-232 communication line.

When an ID is set through an external device, the ID is input through an RS-232 communication port 12, and then is input to the communication terminal (Rx) of the first display module 10. However, since the RS-232 communication lines are bypassed, the allocated ID is input to other display modules as well as the first display module 10. Consequently, the same ID is allocated to all of the multi-vision sets.

Each multi-vision set, which has received the ID, transmits a value corresponding to its ID+1, to a next multi-vision set, sequentially. In this case, each multi-vision set changes the communication terminals to Tx from Rx by controlling the switch 11, and then transmits a value of its ID+1 to the next multi-vision set. As a result, since the communication terminals of all the multi-vision sets are changed to Tx, each multi-vision set cannot transmit the value (ID+1) created by itself, to the next multi-vision set. For instance, even if the first multi-vision set receives an ID and then transmits the value (ID+1) to the second multi-vision set through the communication terminal (Tx), the communication terminal (Rx) of the second multi-vision set is blocked. Thus, the second multi-vision set cannot be allocated with the value of ID+1.

Especially, in such a communication structure, it is impossible to check a reference multi-vision set, since the IR communication lines are connected to each other. The reference multi-vision set indicates a set where ID setting is started, which means a set having an ID value of '1'.

DISCLOSURE OF INVENTION

Technical Problem

In the conventional multi-vision sets connected to each other in a daisy chain form, a reference multi-vision set cannot be identified, since communication lines (IR communication lines and RS232 communication lines) of all of the multi-vision sets are connected to each other. Further, there is a limitation in automatically setting IDs, since the same ID has been allocated to all of the multi-vision sets.

Especially, in the conventional art, since IDs are sequentially allocated in a horizontal-direction writing manner, the number of multi-vision sets positioned in a horizontal direction, or the number of the entire multi-vision sets should be checked.

Solution to Problem

Therefore, an object of the present invention is to provide a multi-vision having a daisy chain type, capable of automatically allocating IDs of multi-vision sets connected to each other in a daisy chain form, and an ID allocating method thereof.

An object of the present invention is to provide a multi-vision having a daisy chain type, capable of allocating IDs to all multi-vision sets within a short time, regardless of the number of multi-vision sets connected to each other, and an ID allocating method thereof.

To achieve these and other advantages and in accordance with the purpose of the present invention, as embodied and broadly described herein, there is provided a multi-vision having a daisy chain type, including: a plurality of multi-vision sets; a first off switch provided at an IR communication line output port of each of the multi-vision sets, and configured to block an IR signal applied to each multi-vision set; series communication lines connected to the plurality of multi-vision sets in a bypass form; a second off switch provided at an output port of the series communication line of each multi-vision set, and configured to block an ID value which is to be bypassed to a next multi-vision set through the series communication line; and a controller configured to set an ID of a reference multi-vision set by blocking the first and second off switches, and configured to transmit an ID increased value to a next multi-vision set by releasing the blocked output state of the second off switch from the reference multi-vision set.

The ID increased value may include a command indicating increase of an ID, or a substantially increased ID value.

The series communication lines may be RS-232 communication lines.

Upon reception of a first IR signal indicating initialization, the controller may block the first and second off switches. Upon reception of a second IR signal for setting of a reference multi-vision set, the controller may convert a communication terminal of a first multi-vision set into Rx, thereby setting an ID value received from an external device via the series communication lines, as an ID of the reference multi-vision set.

Once the ID increased value is transmitted to the next multi-vision set, the controller may turn off the second off switch again.

To achieve these and other advantages and in accordance with the purpose of the present invention, as embodied and broadly described herein, there is also provided an ID allocating method of a multi-vision having a daisy chain type, including: blocking output of an IR communication line and a series communication line of each multi-vision set; setting an ID of a reference multi-vision set; upon setting of the ID of the reference multi-vision set, releasing the blocked output state of the series communication line of the reference multi-vision set, and transmitting an ID increasing command to a next multi-vision set; and the next multi-vision set?s setting an ID according to the ID increasing command, and then transmitting the ID increasing command to a next multi-vision set after releasing the blocked output state of its series communication line.

Output of the IR communication lines and the series communication lines may be blocked when a first IR signal is received from a remote controller.

The step of setting an ID of a reference multi-vision set may include: when a second IR signal is received, converting a communication terminal of a first multi-vision set, a reference multi-vision set, into Rx; receiving an ID value applied from an external device through a series communication port, by an Rx communication terminal through the series communication line; and setting the received ID value as an ID of the reference multi-vision set.

The external device may be a series communication device, and the series communication port may be an RS-232 communication port.

The step of transmitting an ID increasing command to a next multi-vision set may include: releasing the blocked output state of the IR communication line of the multi-vision set; changing the communication terminal into Tx from Rx; releasing the blocked output state of the series communication line of the multi-vision set; and transmitting an ID increasing command to a next multi-vision set, through the series communication line of which blocked state has been released.

The method may further include re-blocking output of the series communication line of which blocked state has been released, if an ID increased value has been transmitted to a next multi-vision set.

The ID increased value may include a command indicating increase of an ID, or a substantially increased ID value.

MODE FOR THE INVENTION

Descriptions will now be given in detail of a multi-vision having a daisy chain type and an ID allocation method thereof, with reference to the accompanying drawings.

For the sake of brief description with reference to the drawings, the same or equivalent components may be provided with the same or similar reference numbers, and description thereof will not be repeated. In general, a suffix such as "module", "unit", "port" and "terminal" may be used to refer to elements or components. Use of such a suffix herein is merely intended to facilitate description of the specification, and the suffix itself is not intended to give any special meaning or function.

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

In this specification, when one element transmits or transfers data or a signal to another element, the data or signal may be transmitted or transferred to said another element directly, or via at least one another element.

Figure 4:
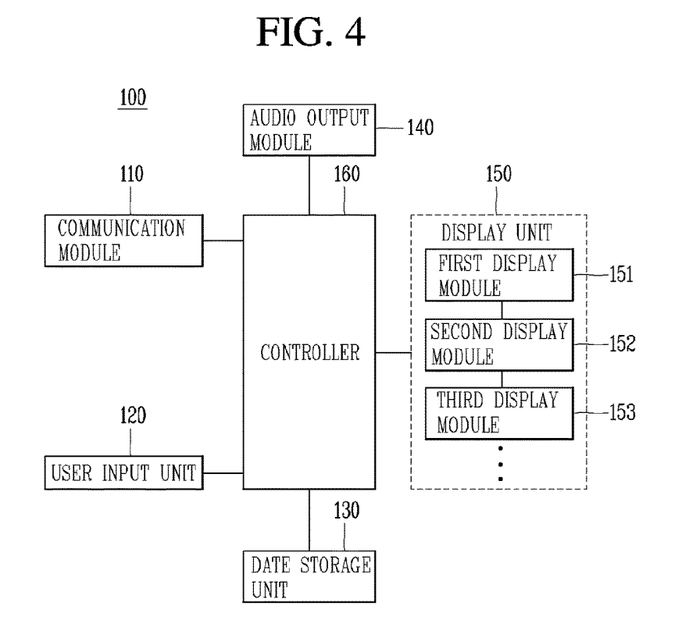
FIG. 4 is a block diagram of a multi-vision 100 according to the present invention.

FIG. 4 is a block diagram of a multi-vision 100 according to the present invention.

As shown in FIG. 4, the multi-vision 100 according to the present invention includes a communication module 110, a user input unit 120, a data storage unit 130, an audio output module 140, a display unit 150, and a controller 160. It is understood that implementing all of the illustrated components in FIG. 2 is not a requirement, and that greater or fewer components may alternatively be implemented as functions of the components are separated from each other, or are integrated with each other.

Hereinafter, the components will be explained sequentially.

The communication module 110 may include one or more modules for connecting the multi-vision 100 to other electronic device, or a wired/wireless network. The communication module 110 may form a wired/wireless network with a content providing server.

For instance, the communication module 110 may include a broadcasting receiving module, a mobile communication module, a wireless Internet module, a short-range communication module, a position information module, etc.

Such a wireless Internet module means a module for accessing the wireless Internet, and may be mounted inside or outside the multi-vision 100. Examples of the wireless Internet module include Wireless LAN (WLAN), Wireless Broadband (WiBro), Worldwide Interoperability for Microwave Access (WiMAX), High Speed Downlink Packet Access (HSDPA), Long Term Evolution (LTE), etc.

The short-range communication module is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, and the like. The short-range communication module may include an infrared ray receiver.

The user input unit 120 is configured to generate input data for controlling an operation of the multi-vision 100 by a user. The user input unit 120 may be implemented as a key pad, a dome switch, a touch pad, a jog wheel, a jog switch, etc.

The data storage unit 130 may be configured to store therein programs for controlling an operation of the multi-vision 100. The data storage unit 130 may store therein content output through the audio output module 140 and/or the display unit 150, temporarily or permanently. Also, the data storage unit 130 may store therein data temporarily or permanently, the data generated during an operation of the multi-vision 100 or received from the outside.

The audio output module 140 may output audio data of content received from the outside or stored in the data storage unit 130.

The display unit 150 is configured to display information processed in the multi-vision 100, or to display image data of content. The display unit 150 may include a plurality of display modules 151, 152 and 153. Although not shown in FIG. 4, the plurality of display modules 151, 152 and 153, referred to as a plurality of sets, may be connected to each other through lines of a daisy chain form. It is illustrated that the display unit 150 includes three display modules. However, the illustration is merely for convenience, and the display unit 150 may include more display modules. The plurality of display modules 151, 152 and 153 may be arranged in a rectangular form as shown in FIG. 1.

Each of the plurality of display modules 151, 152 and 153 may include at least one of a liquid crystal display, a thin film transistor-liquid crystal display, an organic lightemitting diode, a flexible display, and a 3D display.

The controller 160 controls an overall operation of the multi-vision 100. That is, the controller 160 may control an operation of each of the components of the multi-vision 100. In the present invention, the controller 160 performs a control related to an ID allocation of a multi-vision set. For instance, the controller 160 may perform a control operation related to temporary blocking of an IR communication line and an RS-232 communication line, for allocation of IDs of the plurality of display modules 151, 152 and 153 connected to each other in a daisy chain form and included in the multi-vision 100. The operation of the controller 160 will be explained in more detail with reference to the following drawings.

The present invention proposes a method of automatically allocating IDs of a plurality of multi-vision sets connected to each other in a daisy chain form. More specifically, in a multi-vision where IR communication lines and RS-232 communication lines are connected to each other in a daisy chain form, output of an IR signal applied to each multi-vision set is blocked initially, thereby designating a reference multi-vision set. Once the reference multi-vision set is designated, output of RS-232 to be bypassed (ID value) is blocked, thereby designating an ID of the reference multi-vision set. Then, the blocked output state of the RS-232 from the reference multi-vision set is released, and an ID increasing command is transmitted to a next multi-vision set. As a result, IDs are sequentially allocated to a plurality of multi-vision sets.

Figure 5:
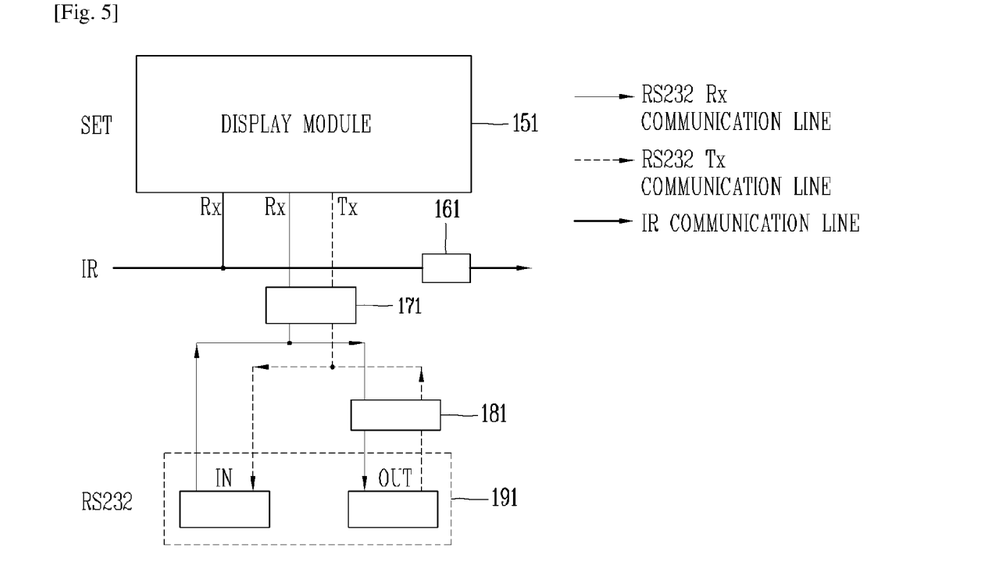
FIG. 5 is a configuration view of each multi-vision set according to an embodiment of the present invention.
Figure 6:
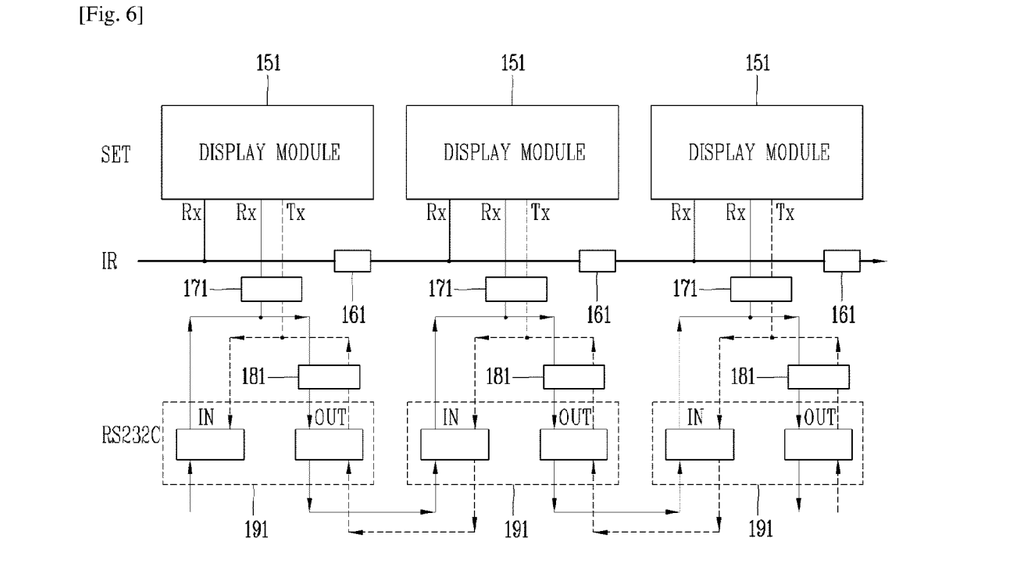
FIG. 6 is a configuration view of a plurality of multi-vision sets connected to each other in a daisy chain form.

FIG. 5 is a configuration view of each multi-vision set according to an embodiment of the present invention, and FIG. 6 is a configuration view of a plurality of multi-vision sets connected to each other in a daisy chain form.

As shown in FIG. 5, the multi-vision of the present invention further includes a first off switch 161 and a second off switch 181, besides each multi-vision set of the conventional art.

The first off switch 161 is located after a connection point of an Rx communication terminal of the display module 151 on an IR communication line, and prevents an IR signal from being transmitted to a next multi-vision set, by being turned on/off under control of the controller 160.

The second off switch 181 is installed at an output port of an RS-232 communication port 191, and allows an ID allocation to each multi-vision set by preventing an ID set by an external device from being bypassed to a next multi-vision set through the RS-232 communication line.

Referring to FIG. 6, the multi-vision sets are connected to each other in a daisy chain form, and the first off switch 161 configured to temporarily block a flow of an IR signal so as to designate a reference multi-vision set is provided at the IR communication line. And the second off switch 181, configured to block a bypassed ID so as to allocate an ID to each multi-vision set, is provided at the RS-232 communication line. Each multi-vision set is allocated with a single communication terminal (or port) (Rx, Tx).

Hereinafter, a multi-vision and an automatic ID allocation method thereof according to an embodiment of the present invention will be explained in more detail.

In the multi-vision of the present invention, it is assumed that an ID is sequentially allocated to each multi-vision set, in order of set installation, in a horizontal-direction writing manner, and the RS-232 communication line has a bypass form.

In the multi-vision according to the present invention, a plurality of multi-vision sets are connected to each other in a daisy chain form, and each multi-vision set has a structure shown in FIG. 5. In the multi-vision, a reference multi-vision set indicates a set having an ID value of ?1?. If a plurality of sets are installed, the reference multi-vision set means the left set.

Figure 7:
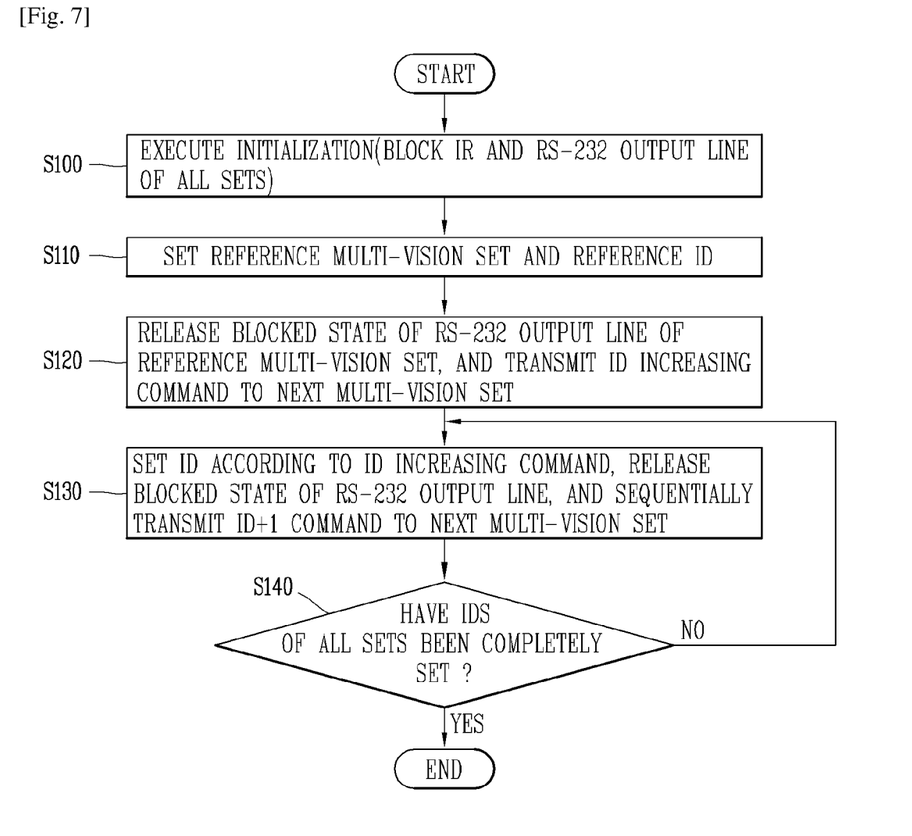
FIG. 7 is a flowchart illustrating an ID allocating method of a multi-vision having a daisy chain type according to an embodiment of the present invention.

FIG. 7 is a flowchart illustrating an ID allocating method of a multi-vision having a daisy chain type according to an embodiment of the present invention.

As shown in FIG. 7, once a first IR signal for initialization is received from a remote controller through the IR communication line, the controller 160 of all sets 151~153 performs an initialization step for turning off the first and second off switches 161 and 181 (S100). The initialization step means a step of blocking an IR signal output and an RS-232 (series communication) output from each multi-vision set, by turning off the first and second off switches 161 and 181.

In this state, if a second IR signal indicating start of an ID allocation is received from the remote controller, the second IR signal is input to only the first multi-vision set 151, by the blocked first off switch 161. As a result, the first multi-vision set 151 is set as a reference multi-vision set. Once designation of the reference multi-vision set, the controller 160 may set an ID of the reference multi-vision set 151 based on an ID value input from an external device (e.g., PC) via RS-232 communication (S110).

Once the ID is set, the controller 160 of the reference multi-vision set 151 releases the blocked state of the first off switch 161 (OFF->ON), and changes the communication terminal to Tx from Rx. Then, the controller 160 transmits an ID increasing command to the next multi-vision set 152 (S120). In another embodiment, the controller 160 may transmit a value of a substantial ID+1, rather than the ID increasing command.

The controller 160 of the next multi-vision set 152 sets an ID based on the ID increasing command transmitted from the reference multi-vision set 151, releases the blocked state of the first off switch 161, and changes the communication terminal to Tx from Rx. Then, the controller 160 releases the blocked state of the second off switch 181, and transmits an ID increasing command to the next multi-vision set 153 (S130).

Such a process is repeatedly executed by the number of installed sets. Upon completion of a process of setting IDs of all sets, the controller 160 of the last multi-vision set terminates the process of setting IDs of all sets (S140).

Figure 8:
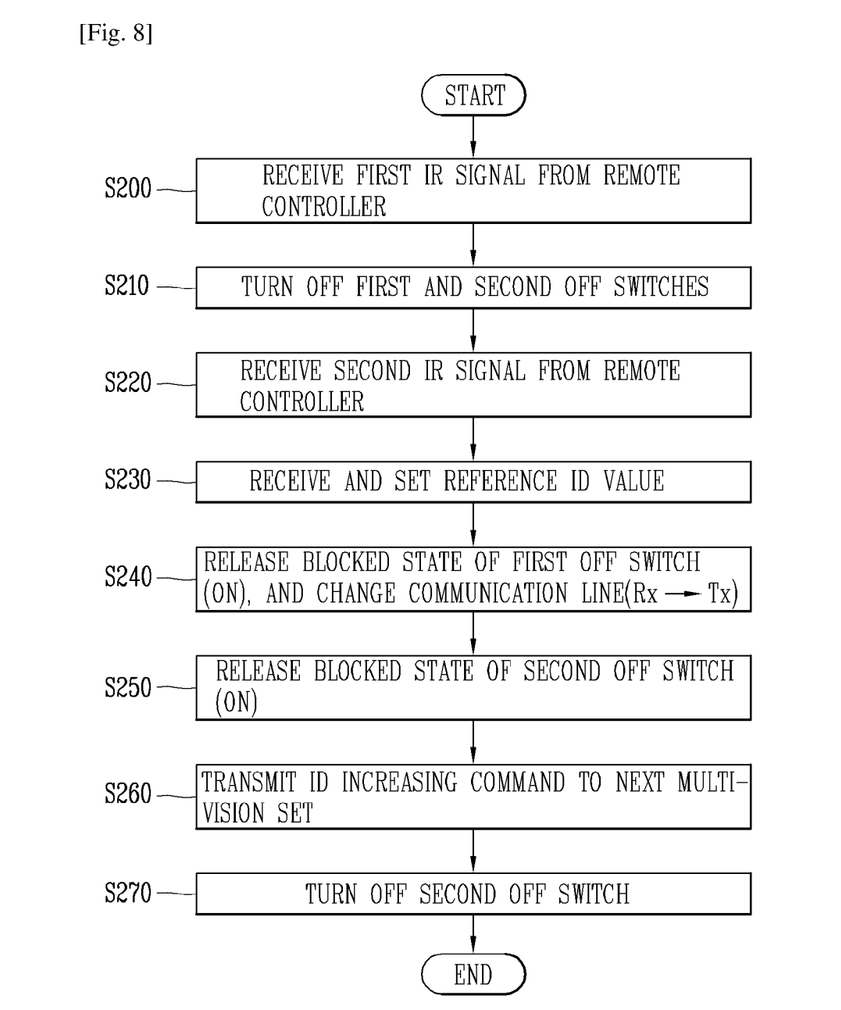
FIG. 8 is a flowchart illustrating a detailed operation of a reference multi-vision set when ID allocation is executed in a multi-vision.

FIG. 8 is a flowchart illustrating a detailed operation of a reference multi-vision set when an ID allocation is executed in a multi-vision.

In the present invention, a reference multi-vision set means a set to which an IR receiver is connected.

In order to set the reference multi-vision set, a user may connect an IR receiver to the first multi-vision set 151 of FIG. 6, and then may transmit a first IR signal for initialization by using a remote controller. The first IR signal is received by the IR receiver, and is input to communication terminals (Rx) of all sets through an IR communication line.

Upon reception of the first IR signal, the controller 160 of the first multi-vision set 151 turns off the first and second off switches 161 and 181, in order to prevent an IR signal and RS-232 data from being transmitted to the next multi-vision set 152 (S200, S210).

Then, once a second IR signal indicating start of ID allocation is received from the remote controller (S220), the second IR signal is input to only the first multi-vision set 151 by the blocked first off switch 171, and is not input to the next multi-vision sets 152 and 153 (S220). Through such processes, the first multi-vision set 151 is set as a reference multi-vision set.

The controller 160 of the reference multi-vision set 151 which has received the second IR signal, controls the communication terminal (Rx) to be connected to an RS-232 Rx communication line by controlling the first off switch 171. In another embodiment, an initialization state of the first off switch 171 may be a connected state between the communication terminal (Rx) and the RS-232 Rx communication line.

A user may input an ID value of the reference multi-vision set 151 via RS-232 communication with an external device. The input ID value of the reference multi-vision set 151 is input through an input terminal (IN) of the RS-232 communication port 191, and then is input to the communication terminal (Rx) through the RS-232 communication line and the first off switch 171. The input ID value is set as an ID of the reference multi-vision set 151 (S230).

Once the reference ID is set, the controller 160 of the reference multi-vision set 151 releases the blocked state of the first off switch 161 (OFF->ON), and changes the communication terminal to Tx from Rx by controlling the first off switch 171. Then, the controller 160 releases the blocked state of the second off switch 181 (OFF=>ON) (S140, S150). In this case, the control order of the first and second off switches may be changed.

Once the second off switch 181 of the reference multi-vision set 151 is turned on, the controller 160 transmits an ID increasing command indicating addition of a value '1' to its ID, to the next multi-vision set 152, through the communication terminal (Tx), the first and second off switches 161 and 181, and an output terminal (OUT) (S160). Upon completion of the transmission of the ID increasing command, the controller 160 blocks the second off switch 181 again. The reason is in order to prevent the ID increasing command from being reversely input to the reference multi-vision set 151, when the next multi-vision set 152 transmits the ID increasing command to the next multi-vision set 153.

Figure 9:
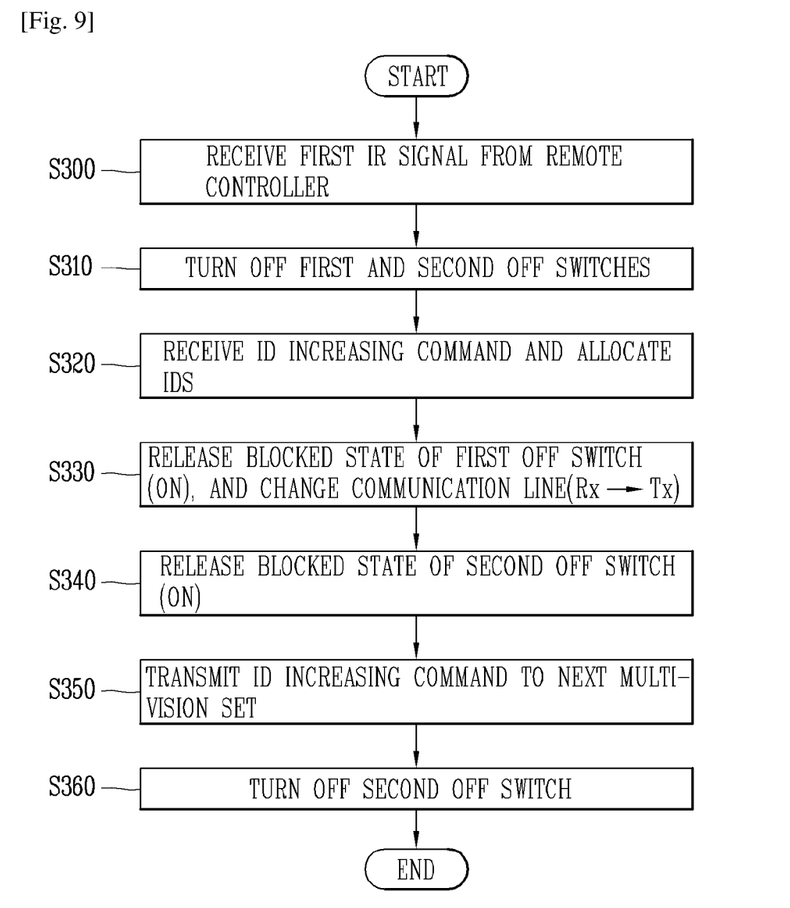
FIG. 9 is a flowchart illustrating a detailed operation of a next multi-vision set when ID allocation is executed in a multi-vision.

FIG. 9 is a flowchart illustrating a detailed operation of a next multi-vision set when an ID allocation is executed in a multi-vision.

As shown in FIG. 9, once the first IR signal is received, the controller 160 of the second multi-vision set 152 turns off the first and second off switches 161 and 181, in order to prevent the IR signal and RS-232 data from being transmitted to the next multi-vision set 153 (S300, S310). Then, the controller 160 changes the communication terminal into Rx by controlling the switch 171.

Then, once the ID increasing command is received from the reference multi-vision set 151 through the input terminal (IN) of the RS-232 communication port 191, the controller 160 of the multi-vision set 152 allocates an ID value ('2' when an ID of the reference multi-vision set is '1') (S320). Then, the controller 160 releases the blocked state of the first off switch 161 (OFF->ON), and changes the communication terminal to Tx from Rx by controlling the switch 171. Then, the controller 160 releases the blocked state of the second off switch 181 (OFF->ON) (S330, S340). In this case, the control order of the first and second off switches may be changed.

Once the second off switch 181 is turned on, the controller 160 of the multi-vision set 152 transmits an ID increasing command indicating addition of a value '1' to its ID, to the next multi-vision set 153, through the communication terminal (Tx), the switch 171, the second off switch and 181, and the output terminal (OUT) (S350). Then, the controller 160 blocks the second off switch 181 again (S360).

The present invention may have the following advantages.

Firstly, as aforementioned, in the multi-vision where the IR communication lines and the RS-232 communication lines are connected to each other in a daisy chain form, a reference multi-vision set is designated as output of an IR signal from each multi-vision set is blocked initially. Then, once the reference multi-vision set is designated, an RS-232 output to be bypassed (ID value) is blocked, thereby designating an ID of the reference multi-vision set. Then, the blocked output state of the RS-232 from the reference multi-vision set is released, and the ID increasing command is transmitted to the next multi-vision set. As IDs are sequentially allocated to a plurality of sets, the plurality of multi-vision sets connected to each other in a daisy chain form can be automatically allocated with the IDs. And IDs can be allocated to all of the multi-vision sets connected to each other within a short time, regardless of the number of the multi-vision sets.

Further, in the present invention, since IDs are automatically allocated to a plurality of multi-vision sets connected to each other in a daisy chain form within a short time, the multi-vision sets can be easily installed, and the IDs can be allocated without overlapping. Further, IDs of all of the multi-vision sets can be set regardless of the number of the multi-vision sets connected to each other.

Various embodiments described herein may be implemented in a computer-readable medium, a machine-readable medium, or similar medium using, for example, software, hardware, or any combination thereof.

By hardware, the above embodiments may be implemented by at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and an electric unit for execution of functions. In some cases, the above embodiments may be implemented by the controller 160.

By software, embodiments related to procedures or functions may be implemented by an additional software module for executing at least one function or operation. A software code may be implemented by a software application written in a proper program language. The software code may be stored in the data storage unit 130, and may be executed by the controller 160.

The aforementioned ID allocating methods of a multi-vision according to the present invention may be implemented in the form of programs which can be executed by various computer means, and may be recorded in a computer-readable medium. The computer-readable medium may include program commands, data files, data structures, etc. solely or by combination. The programs recorded in the medium may be programs specially designed for the present invention, or may be programs wellknown to those skilled in a computer software field.

Various embodiments may be implemented using a machine-readable medium having instructions stored thereon for execution by a processor to perform various methods presented herein. Examples of possible machine-readable mediums include a magnetic medium such as a hard disk drive, a floppy disk, and a magnetic tape, an optical-recording medium such as a CD-ROM and a DVD, a magnetic-optical medium such as a floptical disk, and a hardware device such as ROM, RAM, and a flash memory where program commands are stored. The programs may include not only a machine code (language) formed by a compiler, but also a high-level language code which can be executed by a computer with an interpreter, etc. The hardware device may be implemented as one or more software modules for executing an operation of the present invention, and vice versa.

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A multi-vision having a daisy chain type, comprising:
   a plurality of multi-vision sets connected by a daisy chain type;
   an IR communication line and a series communication line commonly-connected to input terminals and communication terminals of a plurality of multi-vision sets; and
   a controller configured to set an ID of a reference multi-vision set by blocking the IR communication line and the series communication line, and configured to transmit an ID increased value to a next multi-vision set by sequentially releasing the blocked output state of the series communication line from the reference multi-vision set.

2. The multi-vision having a daisy chain type of claim 1, wherein the plurality of multi-vision sets include:
   a first off switch provided at an output port of the IR communication line, and configured to block an IR signal applied to a next multi-vision set; and
   a second off switch provided at an output port of the series communication line, and configured to block an ID value which is to be bypassed to a next multi-vision set through the series communication line,
   wherein the first and second off switches are blocked when the ID of the reference multi-vision set is designated, and the blocked state of the first and second off switches is released when the ID increased value of each multi-vision set is transmitted to the next multi-vision set.

3. The multi-vision having a daisy chain type of claim 1, wherein the series communication line is an RS-232 communication line.

4. The multi-vision having a daisy chain type of claim 1, wherein upon reception of a first IR signal indicating initialization, the controller blocks the IR communication line and the series communication line of each multi-vision set, and
   wherein upon reception of a second IR signal for setting of the reference multi-vision set, the controller converts the communication terminal of a first multi-vision set into Rx, thereby setting an ID value received from an external device via the series communication line, as an ID of the reference multi-vision set.

5. The multi-vision having a daisy chain type of claim 1, wherein the controller blocks again output of the series communication line of which blocked state has been released, if the ID increased value has been transmitted to the next multi-vision set.

6. A multi-vision having a daisy chain type, comprising:
a plurality of multi-vision sets;
a first off switch provided at an output port of an IR communication line of each of the multi-vision sets, and configured to block an IR signal applied to each multi-vision set;
series communication lines connected to the plurality of multi-vision sets in a bypass form;
a second off switch provided at an output port of a series communication line of each multi-vision set, and configured to block an ID value which is to be bypassed to a next multi-vision set through the series communication line; and
a controller configured to set an ID of a reference multi-vision set by blocking the first and second off switches, and configured to transmit an ID increased value to a next multi-vision set by releasing the blocked output state of the second off switch from the reference multi-vision set.

7. The multi-vision having a daisy chain type of claim 6, wherein the ID increased value includes a command indicating increase of an ID, or a substantially increased ID value.

8. The multi-vision having a daisy chain type of claim 6, wherein the series communication line is an RS-232 communication line.

9. The multi-vision having a daisy chain type of claim 6, wherein upon reception of a first IR signal indicating initialization, the controller blocks the first and second off switches, and
wherein upon reception of a second IR signal for setting of the reference multi-vision set, the controller converts a communication terminal of the first multi-vision set into Rx, thereby setting an ID value received from an external device via the series communication line, as an ID of the reference multi-vision set.

10. The multi-vision having a daisy chain type of claim 6, wherein the controller blocks the second off switch again, if the ID increased value has been transmitted to the next multi-vision set.

11. An ID allocating method of a multi-vision having a daisy chain type, comprising:
blocking output of an IR communication line and a series communication line of each multi-vision set;
setting an ID of a reference multi-vision set;
upon designation of the ID of the reference multi-vision set, releasing the blocked output state of the series communication line of the reference multi-vision set, and transmitting an ID increasing command to a next multi-vision set; and
the next multi-vision set setting an ID according to the ID increasing command, and then transmitting the ID increasing command to a next multi-vision set after releasing the blocked output state of its series communication line.

12. The method of claim 11, wherein output of the IR communication line and the series communication line is blocked when a first IR signal is received from a remote controller.

13. The method of claim 11, wherein the setting of an ID of a reference multi-vision set includes:
when a second IR signal is received, converting a communication terminal of a first multi-vision set, a reference multi-vision set, into Rx;
receiving an ID value applied from an external device through a series communication port, by an Rx communication terminal through the series communication line; and
setting the received ID value as an ID of the reference multi-vision set.

14. The method of claim 13, wherein the external device is a series communication device, and the series communication port is an RS-232 communication port.

15. The method of claim 13, wherein the transmitting of an ID increasing command to a next multi-vision set includes:
releasing the blocked output state of the IR communication line of the multi-vision set;
changing the communication terminal into Tx from Rx;
releasing the blocked output state of the series communication line of the multi-vision set; and
transmitting an ID increasing command to a next multi-vision set, through the series communication line of which blocked state has been released.

16. The method of claim 11, further comprising re-blocking output of the series communication line of which blocked state has been released, if an ID increased value has been transmitted to a next multi-vision set.

17. The method of claim 11, wherein the ID increased value includes a command indicating increase of an ID, or a substantially increased ID value.

* * * * *